US012609134B2

(12) United States Patent
Uzan et al.

(10) Patent No.: US 12,609,134 B2
(45) Date of Patent: Apr. 21, 2026

(54) ONSET ZONE DETECTION USING COHERENT FOCUSING SUMMATION OVER MULTIPLE GEOMETRIC POSITIONS

(71) Applicant: GM Global Technology Operations LLC, Detroit, MI (US)

(72) Inventors: Lionel Uzan, Raanana (IL); Elior Hadad, Ness-Ziona (IL); Amos Schreibman, Hod Hasharon (IL); Moshe Tzur, Petah Tikva (IL)

(73) Assignee: GM Global Technology Operations LLC, Detroit, MI (US)

(*) Notice: Subject to any disclaimer, the term of this patent is extended or adjusted under 35 U.S.C. 154(b) by 208 days.

(21) Appl. No.: 18/628,373

(22) Filed: Apr. 5, 2024

(65) Prior Publication Data

US 2025/0316285 A1 Oct. 9, 2025

(51) Int. Cl.
*G10L 25/78* (2013.01)
*G10L 25/06* (2013.01)
(Continued)

(52) U.S. Cl.
CPC .............. *G10L 25/78* (2013.01); *G10L 25/06* (2013.01); *G10L 25/18* (2013.01); *G10L 25/21* (2013.01);
(Continued)

(58) Field of Classification Search
CPC ......... G10L 25/78; G10L 25/06; G10L 25/18; G10L 25/21; G10L 2025/783;
(Continued)

(56) References Cited

U.S. PATENT DOCUMENTS

2015/0156587 A1 6/2015 Herbig et al.

FOREIGN PATENT DOCUMENTS

CN 110412499 * 11/2019
CN 110412499 A 11/2019
(Continued)

OTHER PUBLICATIONS

DE102016212647B4-Orig, 2017 (Year: 2017).*

*Primary Examiner* — Darioush Agahi
(74) *Attorney, Agent, or Firm* — Honigman LLP; Matthew H. Szalach; Jonathan P. O'Brien

(57) ABSTRACT

A method includes receiving a multichannel input signal captured in an environment of a vehicle and, for each zone in the environment, performing speech detection by converting each frame in a sequence of frames of the multichannel input signal into a plurality of frequency sub-bands each having a cross-correlation matrix (CCM). For each sub-band, the method also includes applying a focusing matrix to the CCM to generate a corrected CCM, extracting eigenvalues from the corrected CCM, and determining an eigenvalue ratio between a highest and a second highest extracted eigenvalue. The method further includes calculating a median value of the eigenvalue ratios of the plurality of frequency sub-bands, determining a difference between the respective median values of the zones, and when an absolute value of the difference between the respective median values of the zones is greater than a threshold, generating an initial detection of speech indication.

20 Claims, 6 Drawing Sheets

(51) Int. Cl.
*G10L 25/18* (2013.01)
*G10L 25/21* (2013.01)
*H04S 3/00* (2006.01)

(52) U.S. Cl.
CPC ........ *H04S 3/008* (2013.01); *G10L 2025/783* (2013.01); *H04R 2499/13* (2013.01); *H04S 2400/01* (2013.01); *H04S 2400/15* (2013.01)

(58) Field of Classification Search
CPC ..... G10L 15/00; H04S 3/008; H04S 2400/01; H04S 2400/15; H04R 2499/13; H04R 1/40; G01S 5/18; G01S 3/802
See application file for complete search history.

(56) References Cited

FOREIGN PATENT DOCUMENTS

| | | | | | | |
|---|---|---|---|---|---|---|
| CN | 113422630 | A | * | 9/2021 | ............. | H04B 7/086 |
| DE | 102016212647 | A1 | * | 6/2017 | ............. | G10L 15/22 |

* cited by examiner

ONSET ZONE DETECTION USING COHERENT FOCUSING SUMMATION OVER MULTIPLE GEOMETRIC POSITIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method of onset zone detection using coherent focusing summation over multiple geometric positions. In particular, a user's manner of interacting with a user interface of a vehicle system is designed primarily, if not exclusively, by means of voice input. For example, a user may ask the vehicle to perform an action including media playback (e.g., music or podcasts), where the user interface responds by initiating playback of audio that matches the user's criteria. In instances where multiple microphones pick up multiple users (e.g., a driver and a passenger) speaking in the vehicle, the vehicle may need to identify which user spoke a requested action.

SUMMARY

One aspect of the disclosure provides a computer-implemented method for onset zone detection using coherent focusing summation over multiple geometric positions that when executed on data processing hardware causes the data processing hardware to perform operations that include receiving a multichannel input signal including a sequence of frames captured in an environment of a vehicle, the environment of the vehicle having at least two zones. For each zone of the at least two zones of the environment of the vehicle, the operations also include performing speech detection by converting each frame in the sequence of frames of the multichannel input signal into a plurality of frequency sub-bands, each frequency sub-band including a respective cross-correlation matrix (CCM), and, for each respective frequency sub-band of the plurality of frequency sub-bands applying a focusing matrix to the respective CCM to generate a corrected CCM, extracting eigenvalues from the corrected CCM, and determining an eigenvalue ratio between a highest eigenvalue extracted from the corrected CCM and a second highest eigenvalue extracted from the corrected CCM. For each zone of the at least two zones, the operations also include, for each frame in the sequence of frames, calculating a median value of the eigenvalue ratios of the plurality of frequency sub-bands. The operations further include determining a difference between the respective median values of the at least two zones of the environment of the vehicle, and when an absolute value of the difference between the respective median values of the at least two zones of the environment of the vehicle is greater than a threshold, generating an initial detection of speech indication.

Implementations of the disclosure may include one or more of the following optional features. In some implementations, the operations further include converting the multichannel input signal into the sequence of frames. In some examples, the focusing matrix is initialized from a steering vector unique to a model of the vehicle.

In some implementations, the operations further include, for each zone of the at least two zones of the environment of the vehicle, confirming the presence of speech in each frame in the sequence of frames by projecting the multichannel input signal on a steering vector of the vehicle to generate a projection, determining an average energy of the plurality of frequency sub-bands, and when the average energy exceeds a directionality threshold, confirming the presence of speech in the multichannel input signal. In these implementations, the operations may further include determining a difference between the respective projections of the at least two zones, and when the difference between the respective projections exceeds a dominance threshold, generating a confirmation detection of speech indication identifying a zone of the at least two zones as a source of the speech in the multichannel input signal. Here, identifying the zone of the at least two zones as the source of the speech in the multichannel input signal may be based on the initial detection of speech indication and the confirmation detection of speech indication. Optionally, the steering vector is unique to the vehicle.

In some examples, the plurality of frequency sub-bands are in the frequency domain. In some implementations, the at least two zones includes a first zone and a second zone. In some examples, the speech detection is performed without historical audio data.

Another aspect of the disclosure provides a system for onset zone detection using coherent focusing summation over multiple geometric positions that includes data processing hardware and memory hardware in communication with the data processing hardware. The memory hardware stores instructions that when executed by the data processing hardware cause the data processing hardware to perform operations that include receiving a multichannel input signal including a sequence of frames captured in an environment of a vehicle, the environment of the vehicle having at least two zones. For each zone of the at least two zones of the environment of the vehicle, the operations also include performing speech detection by converting each frame in the sequence of frames of the multichannel input signal into a plurality of frequency sub-bands, each frequency sub-band including a respective cross-correlation matrix (CCM), and, for each respective frequency sub-band of the plurality of frequency sub-bands applying a focusing matrix to the respective CCM to generate a corrected CCM, extracting eigenvalues from the corrected CCM, and determining an eigenvalue ratio between a highest eigenvalue extracted from the corrected CCM and a second highest eigenvalue extracted from the corrected CCM. For each zone of the at least two zones, the operations also include, for each frame in the sequence of frames, calculating a median value of the eigenvalue ratios of the plurality of frequency sub-bands. The operations further include determining a difference between the respective median values of the at least two zones of the environment of the vehicle, and when an absolute value of the difference between the respective median values of the at least two zones of the environment of the vehicle is greater than a threshold, generating an initial detection of speech indication.

This aspect may include one or more of the following optional features. In some implementations, the operations further include converting the multichannel input signal into the sequence of frames. In some examples, the focusing matrix is initialized from a steering vector unique to a model of the vehicle.

In some implementations, the operations further include, for each zone of the at least two zones of the environment of the vehicle, confirming the presence of speech in each frame in the sequence of frames by projecting the multichannel input signal on a steering vector of the vehicle to generate a projection, determining an average energy of the plurality of frequency sub-bands, and when the average energy exceeds a directionality threshold, confirming the presence of speech in the multichannel input signal. In these implementations, the operations may further include determining a difference between the respective projections of the at least two zones, and when the difference between the respective projections exceeds a dominance threshold, generating a confirmation detection of speech indication identifying a zone of the at least two zones as a source of the speech in the multichannel input signal. Here, identifying the zone of the at least two zones as the source of the speech in the multichannel input signal may be based on the initial detection of speech indication and the confirmation detection of speech indication. Optionally, the steering vector is unique to the vehicle.

In some examples, the plurality of frequency sub-bands are in the frequency domain. In some implementations, the at least two zones includes a first zone and a second zone. In some examples, the speech detection is performed without historical audio data.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
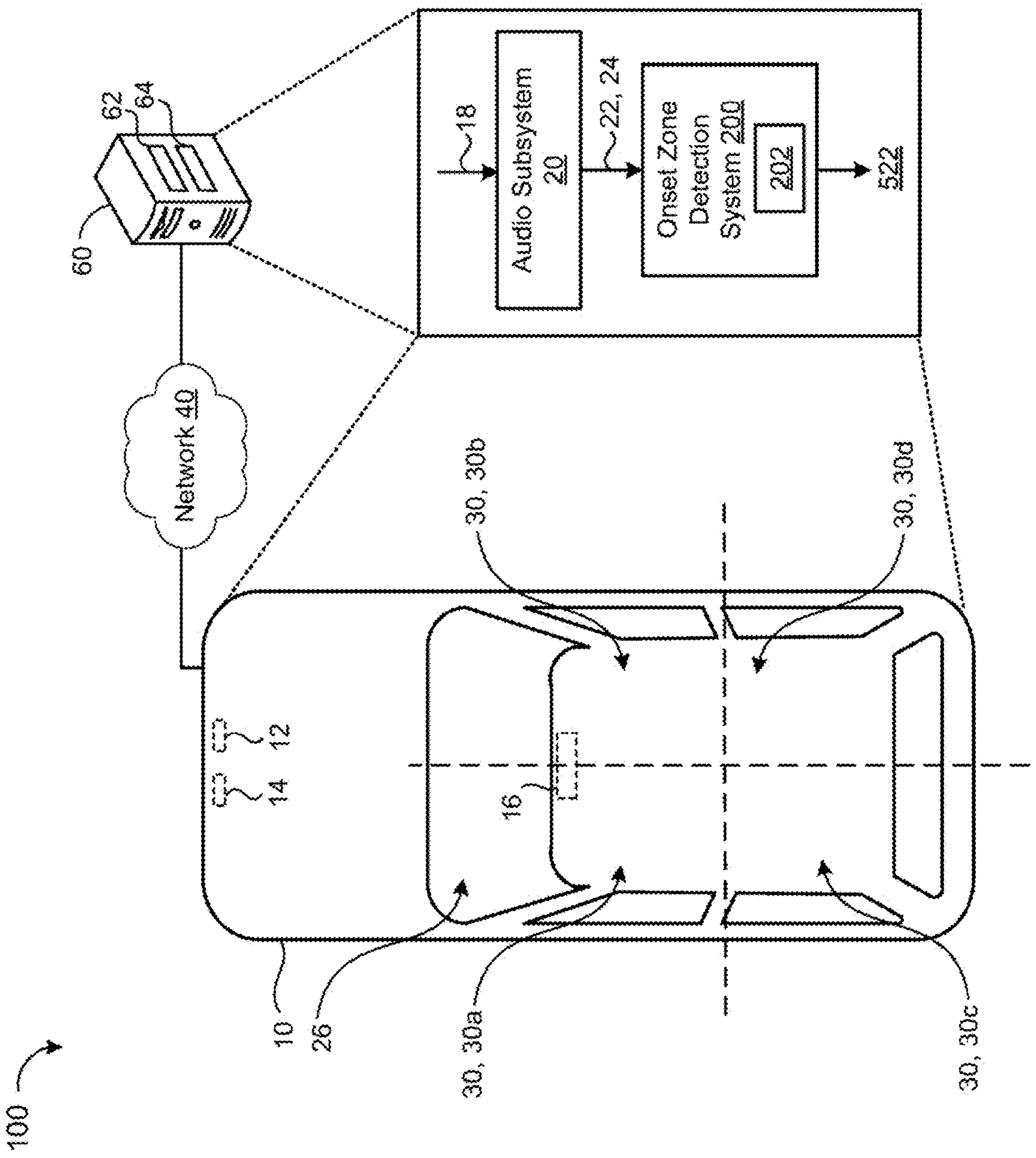
FIG. 1 is a schematic view of an example system for onset zone detection.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising." "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program," Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube). LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, in some implementations, a system 100 includes a vehicle 10 and/or a remote system 60 in communication with the vehicle 10 via a network 40. The vehicle 10 captures speech utterances 18 from one or more users (i.e., a driver and/or one or more passengers) in an environment 26 of the vehicle 10 and processes the speech utterances 18 to detect a zone 30 of the vehicle 10 that the speaker of the speech utterance 18 is located. As will be described in greater detail blow, by detecting the zone 30 of the speaker of the utterance 18, the vehicle 10 may more accurately differentiate from speech between a driver, a passenger, and a back seat passenger of the vehicle 10. A user may speak the utterance 18 as a query or a command to solicit a response from the vehicle 10. The vehicle 10 is configured to capture sounds from one or more users within the environment 26. Here, the audio sounds may refer to a spoken utterance 18 by the user that functions as an audible query, a command for the vehicle 10, or an audible communication captured by the vehicle 10. Speech-enabled systems of the vehicle 10 or associated with the vehicle 10 may field the query for the command by answering the query and/or causing the command to be performed.

The vehicle 10 and/or the remote system 60 execute an onset zone detection system 200 that detects a speaker of the utterance 18 in only a single frame 24. Put another way, unlike traditional directional voice activity detectors (DVADs) that require historical audio data to generate a decision on a current audio frame, the onset zone detection system 200 detects a zone 30 of a speaker without historical audio data, and performs well on short utterances 18 (e.g., utterances<200 milliseconds in length) that may be used in downstream speech processing, as well as generally on utterances 18 of any length of time that may be captured inside the vehicle 10. The onset zone detection system 200 is configured to receive, as input, a multichannel input signal 22 including a plurality of frames 24 captured in the environment 26 of the vehicle 10. As shown in FIG. 1, the environment 26 of the vehicle 10 generally includes the interior cabin of the vehicle 10, where a microphone array 16 is disposed within a headliner of the interior of the vehicle 10 and located at a forward portion of the vehicle 10 between a driver area and a passenger area of the vehicle 10. The environment 26 may generally be divided into two or more zones 30, each zone 30 corresponding to a user location within the vehicle 10. As shown, the vehicle 10 may include four (4) zones 30, 30*a*-30*d*, where zone 30*a* corresponds to a driver seat, zone 30*b* corresponds to a front passenger seat, and zones 30*c*, 30*d* correspond to rear passenger seats for the left and right of the vehicle 10. While the examples used generally refer to the two zones 30*a*, 30*b*, it should be understood that the onset zone detection system 200 may detect more than two zones 30*a*, 30*b*, such as, three (3) zones 30*a*-30*c*, or any further combination of zones 30.

In the examples shown, the onset zone detection system 200 is implemented within the vehicle 10. However, the onset zone detection system 200 can be implemented on other computing devices (e.g., computing devices in communication with the vehicle 10), such as, without limitation, a smart phone, tablet, smart display, desktop/laptop, smart watch, smart appliance, or smart glasses/headset. The vehicle 10 includes data processing hardware 12 and memory hardware 14 storing instructions that when executed on the data processing hardware 12 cause the data processing hardware 12 to perform operations. As shown, the vehicle 10 is in communication with the remote system 60 via the network 40. The remote system 60) (e.g., server, cloud computing environment) also includes data processing hardware 62 and memory hardware 64 storing instructions that when executed on the data processing hardware 62 cause the data processing hardware 62 to perform operations. In some examples, execution of the onset zone detection system 200 is shared across the vehicle 10 and the remote system 60.

The vehicle 10 further includes (or is in communication with) an audio subsystem 20 with the microphone array 16 for capturing and converting spoken utterances 18 within the environment 26 of the vehicle 10 into electrical signals. Each microphone 16 in the array of microphones 16 of the vehicle 10 may separately record the utterance 18 on a separate dedicated channel of the multichannel input signal 22. For example, the vehicle 10 may include two microphones 16 (also referred to as a microphone array 16) that each record the utterance 18, and the recordings from the two microphones 16 may be combined into a two-channel input signal 22 (i.e., stereophonic audio or stereo). However, it should be appreciated that the microphone array 16 may include any number of microphones 16. Moreover, while the vehicle 10 in the example of FIG. 1 includes the microphone array 16, other examples may include additional configurations in any location within the vehicle 10, such as, without limitation, two (2) front microphone arrays, four (4) microphone arrays, etc.

The audio subsystem 20 is configured to receive the spoken utterance 18 captured by the array of microphones 16, and to convert the utterance 18 into a corresponding digital format associated with acoustic frames 24 capable of being processed by the onset zone detection system 200. In the example shown in FIG. 1, the audio subsystem 20 converts the utterance 18 into a multichannel input signal 22 including a sequence of acoustic frames (e.g., audio data) 24 for input to a zone detection model 202 (also referred to as the model 202) of the onset zone detection system 200. Thereafter, the model 202 generates/predicts, as output, an initial detection of speech indication 412. The initial detection of speech indication 412 indicates whether a particular frame 24 includes speech, and if so, which of the two zones 30*a*. 30*b* that speech from the particular frame 24 originates from. The model 202 then receives, as input, a steering vector 252 of the vehicle 10 and, for each zone 30*a*. 30*b* in the environment 26 of the vehicle 10, confirms the presence of speech in each frame 24 in the sequence of frames 24 to generate, as output, a confirmation detection of speech indication 522 identifying which zone 30*a*, 30*b* is a source of the speech in the multichannel input signal 22. The zone detection model 202 may identify one of the zones 30*a*, 30*b* as the source of the speech in the multichannel input signal 22 based on the initial detection of speech indication 412 and the confirmation detection of speech indication 522.

Figure 2:
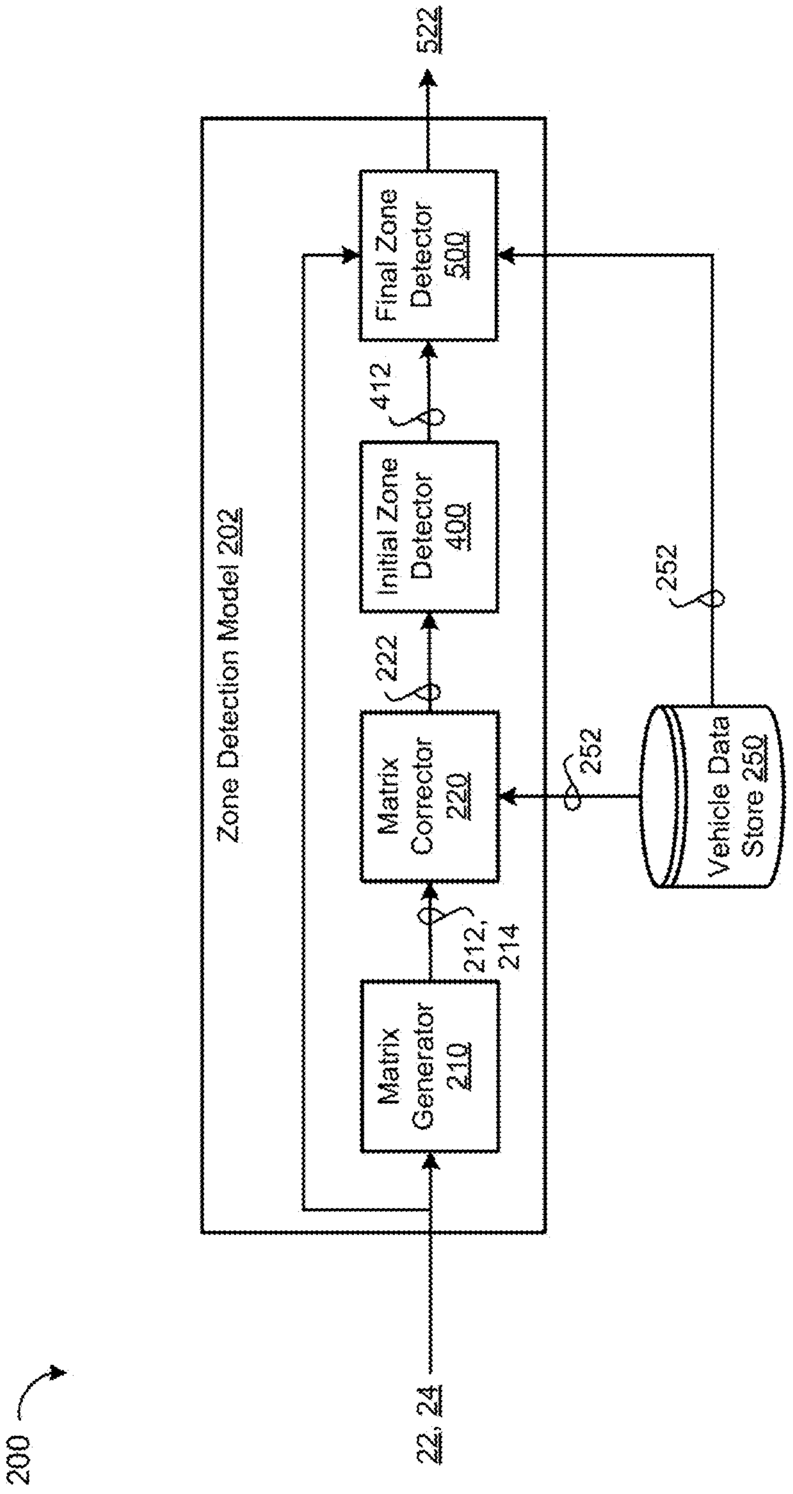
FIG. 2 is a schematic view of example components of the system of FIG. 1.

With reference to FIGS. 1 and 2, the zone detection model 202 of the onset zone detection system 200 includes a matrix generator 210, a matrix corrector 220, an initial zone detector model 400, and a final zone detector model 500. The onset zone detection system 200 may have access to a steering vector 252 stored in a vehicle data store 250 that resides on the memory hardware 14 of the vehicle 10 and/or the memory hardware 64 of the remote system 60. The steering vector 252 may be unique to the vehicle 10 (e.g., the model of the vehicle 10), and is tuned offline. The steering vector 252 may be based on delays or a relative transform function (RTF). In some implementations, the steering vector 252 includes multiple steering vectors approximating the same zones 30.

Figure 3:
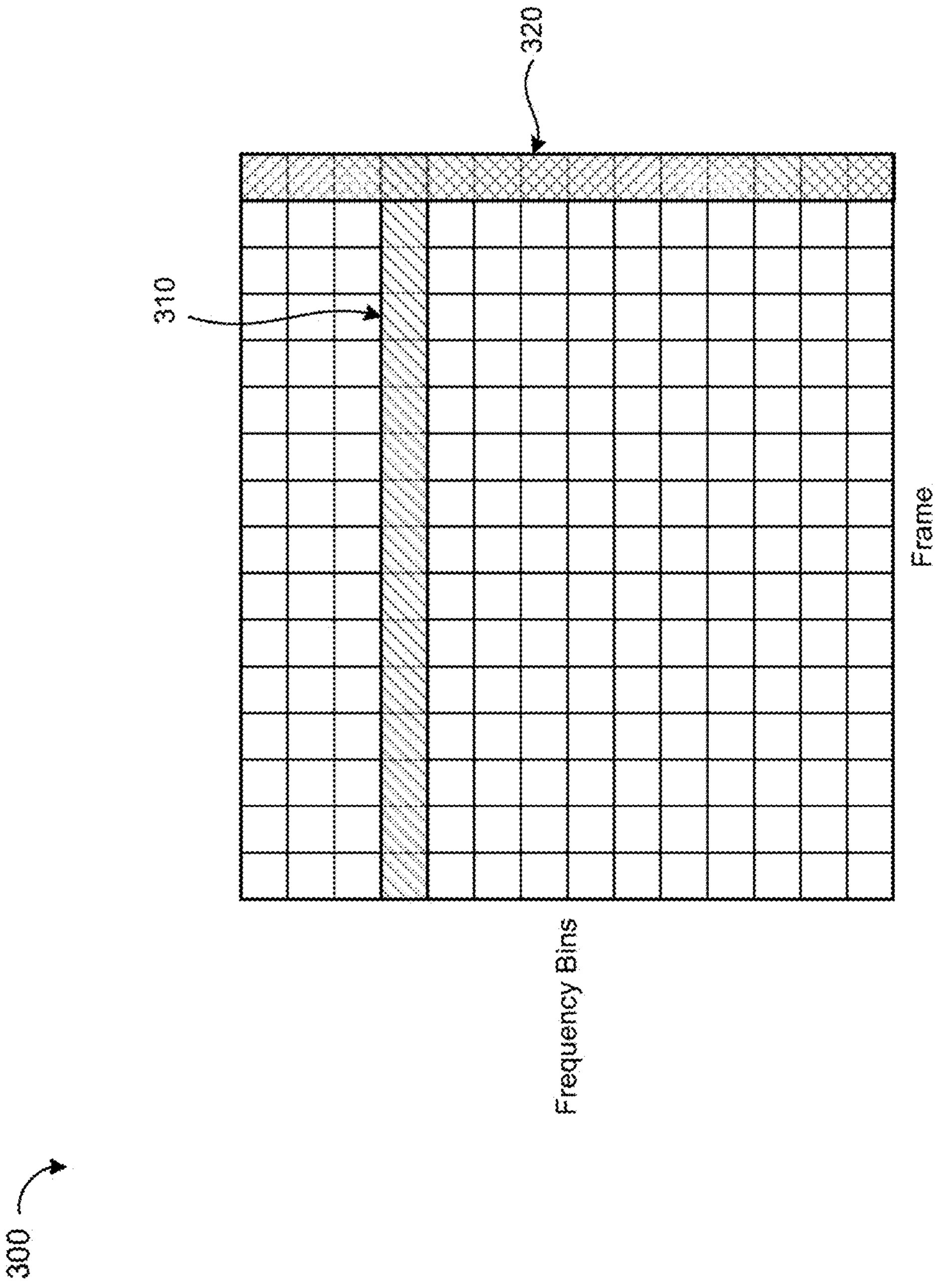
FIG. 3 is a schematic view of a frequency space.

The matrix generator 210 is configured to receive, as input, the multichannel input signal 22 including the plurality of frames 24 and, for each frame 24, convert each frame 24 into a plurality of frequency sub-bands 212. Each frequency sub-band 212 includes a respective cross-correlation matrix (CCM) 214. The plurality of frequency sub-bands 212 may be in the frequency domain. Referring briefly to FIG. 3, a frequency space 300 is shown, with the frames 24 on the x-axis and the frequency sub-bands 212 on the y-axis. Unlike traditional frame classification, that evaluates a combination of frequency sub-bands over time, as indicated by selection 310, to detect a speaker, the matrix generator 210 splits each frame 24 into the plurality of frequency sub-bands 212, as indicated by selection 320, to detect a speaker.

Referring again to FIG. 2, the matrix corrector 220 is configured to receive, as input, the plurality of frequency sub-bands 212 and the respective CCMs 214 output by the matrix generator 210, and the steering vector 252, and generate, for each respective frequency sub-band 212 of the plurality of frequency sub-bands 212, a corrected CCM 222. In particular, the matrix corrector applies a focusing matrix T for each frequency sub-band 212 and each zone 30 to each respective CCM 214. A respective focusing matrix T may be initialized for each frequency sub-band 212 and each zone 30 in the environment 26 of the vehicle 10, where each focusing matrix T is initialized from the steering vector A 252. The focusing matrix T may be defined as follows:

$$T(k, d) = V(k, d)U*(k, d), \tag{1}$$

where k denotes an index of each frequency bin, d denotes two potential directions ($d \in [1,2]$) (e.g., zones 30*a*, 30*b* of the environment 26 of the vehicle 10), U denotes the left singular vector of a Singular Value Decomposition of $C_A$, and V denotes the right singular vector of the Singular Value Decomposition of $C_A$, and the $C_A$ is defined as follows:

$$C_A = A(k, d)A*(k_0, d), \tag{2}$$

where $k_0$ denotes the center frequency sub-band 212.

For each zone 30 and for each respective frequency sub-band 212 of the plurality of frequency sub-bands 212, the matrix corrector 220 may apply a respective focusing matrix T to the respective CCM 214 to generate the corrected CCM 222. Put differently, for the first zone 30*a* and for each respective frequency sub-band 212, the matrix corrector 220 applies a respective focusing matrix T to the respective CCM 214 to generate the corrected CCM 222, and for the second zone 30*b* and for each respective frequency sub-band 212, the matrix corrector 220 applies a respective focusing matrix T to the respective CCM 214 to generate the corrected CCM 222. For example, each CCM 214 is corrected by using its respective focusing matrix T by:

$$R_{k_0,d} = \frac{1}{K}\sum_{k=k_L}^{k_H} T_{k,d} R_{k,d} T_{k,d}^H, \tag{3}$$

where $R_{k_0,d}$ denotes the corrected CCM 222, $[k_L, k_H]$ denotes the range of frequency averaging, $K=K_H-K_L+1$, and $k_0$ denotes the center frequency sub-band 212. Here, rather than selecting a single center bin for an entire range, the frame 24 is split into frequency sub-bands 212, and one center bin is associated with one frequency sub-band 212 to reduce the error of the correction due to the large differences in frequency. In other words, the matrix corrector 220 generates one $R_{k_0,d}$ (i.e., corrected CCM 222) for each one frequency sub-band 212.

Figure 4:
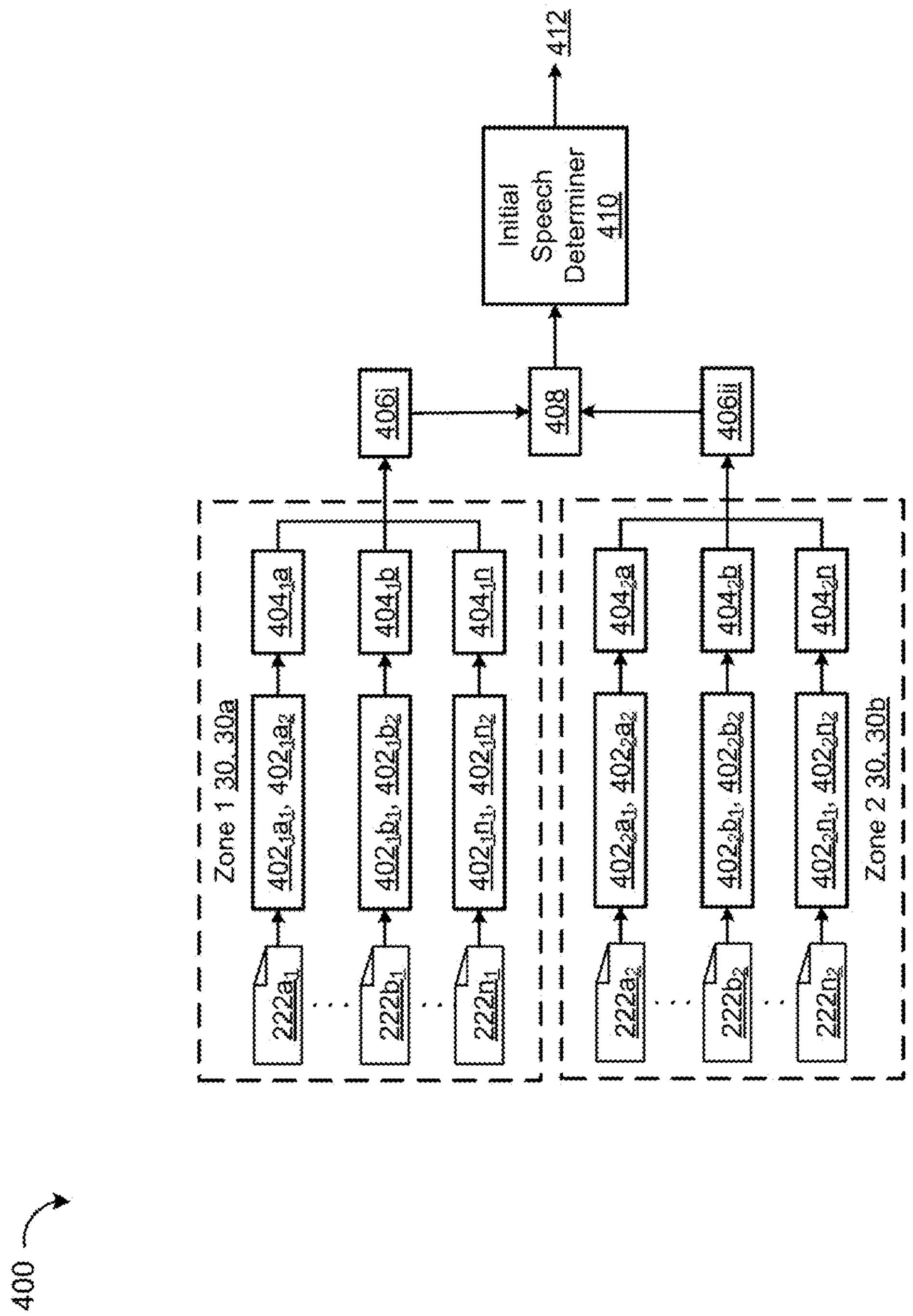
FIG. 4 is a flowchart of an example arrangement of operations for a method of generating an initial zone prediction of a speaker.

Referring to FIG. 4, the initial zone detector model 400 is configured to receive the corrected CCMs 222 for each zone 30*a*, 30*b* (also referred to as Zone 1 and Zone 2) and for each respective frequency sub-band 212 of the plurality of frequency sub-bands 212, and generate the initial detection of speech indication 412. In the example shown, the initial zone detector model 400 receives the corrected CCMs 222*a*1-222*n*1 for a first zone 30*a*, and the corrected CCMs 222*a*2-222*n*2 for the second zone 30*b*. Thereafter, for each zone 30*a*, 30*b*, the initial zone detector model 400 extracts sorted eigenvalues $\mathbf{402}_1$, $\mathbf{402}_2$ from each corrected CCM 222. In particular, for the zone 30*a*, the initial zone detector model 400 extracts the highest eigenvalues $\mathbf{402}_1a_1$, $\mathbf{402}_1b_1$, $\mathbf{402}_1n_1$ from the respective corrected CCMs $\mathbf{222}a_1$, $\mathbf{222}b_1$, $\mathbf{222}n_1$ and the second highest eigenvalues $\mathbf{402}_1a_2$, $\mathbf{402}_1b_2$, $\mathbf{402}_1n_2$ and determines a respective eigenvalue ratio $\mathbf{404}_1a$, $\mathbf{404}_1b$, $\mathbf{404}_1n$ for each of the respective corrected CCMs $\mathbf{222}a_1$, $\mathbf{222}b_1$, $\mathbf{222}n_1$. Likewise, for the zone 30*b*, the initial zone detector model 400 extracts the highest eigenvalues $\mathbf{402}_2a_1$, $\mathbf{402}_2b_1$, $\mathbf{402}_2n_1$ from the respective corrected CCMs $\mathbf{222}a_2$, $\mathbf{222}b_2$, $\mathbf{222}n_2$ and the second highest eigenvalues $\mathbf{402}_2a_2$, $\mathbf{402}_2b_2$, $\mathbf{402}_2n_2$ and determines a respective eigenvalue ratio $\mathbf{404}_2a$, $\mathbf{404}_2b$, $\mathbf{404}_2n$ for each of the respective corrected CCMs $\mathbf{222}a_2$, $\mathbf{222}b_2$, $\mathbf{222}n_2$. The respective eigenvalue ratio 404 is expressed as:

$$\rho_{k_0,d} = \frac{\lambda_1}{\lambda_2}, \tag{4}$$

where $\lambda_1$ denotes the highest eigenvalue 402 extracted from the corrected CCM 222, and $\lambda_2$ denotes the second highest eigenvalue 402 extracted from the corrected CCM 222. Notably, the respective eigenvalue ratio 404 indicates the rank of the corrected CCM 222 that directly links to the source (point or omni) of the utterance 18.

The initial zone detector model 400 computes, for each zone 30*a*, 30*b*, and for each frame 24, a median value 406 of the eigenvalue ratios 404 of the plurality of frequency sub-bands 212. In other words, the median value $\widetilde{\rho_d}$ 406 for a given direction d (i.e., zones 30*a*, 30*b*) is defined as:

$$\widetilde{\rho_d} = med(\rho_{k_0,d}). \tag{5}$$

For example, as shown in FIG. 4, the initial zone detector model 400 computes a median value $\widetilde{\rho_1}$ 406*i* corresponding to the first zone 30*a*, and a median value $\widetilde{\rho_2}$ 406*ii* corresponding to the second zone 30*b*, and calculates a difference 408 between the median value $\widetilde{\rho_1}$ 406*i* of the first zone 30*a* and the median value $\widetilde{\rho_2}$ 406*ii* of the second zone 30*b*. For example, the median value $\widetilde{\rho_1}$ 406*i* of the first zone 30*a* may be subtracted from the median value $\widetilde{\rho_2}$ 406*ii* of the second zone 30*b*. When an absolute value of the difference 408 between the median value $\widetilde{\rho_1}$ 406*i* of the first zone 30*a* and the median value $\widetilde{\rho_2}$ 406*ii* of the second zone 30*b* is less than an initial threshold, then the initial zone detector model 400 may generate an initial detection of speech indication 412 indicating that the frame 24 does not contain speech. Conversely, when the absolute value of the difference 408 between the median value $\widetilde{\rho_1}$ 406*i* of the first zone 30*a* and the median value $\widetilde{\rho_2}$ 406*ii* of the second zone 30*b* is greater than the initial threshold, the initial zone detector model 400 generates an initial detection of speech indication 412 indicating that the frame 24 contains speech. Here, the initial threshold may be set during tuning and may be unique to the model of the vehicle 10.

Referring again to FIG. 2, when the initial zone detector model 400 generates an initial detection of speech indication 412 indicating that the frame 24 contains speech, the zone detection model 202 executes the final zone detector model 500 to confirm or reject the initial detection of speech indication 412 output by the initial zone detector model 400. In other words, for each zone 30*a*, 30*b* of the environment 26 of the vehicle 10, the final zone detector model 500 confirms or rejects the presence of speech in each frame 24 in the sequence of frames 24. The final zone detector model 500 is configured to receive the multichannel input signal 22 and the steering vector 252, and generate a confirmation detection of speech indication 522 identifying which zone 30$a$, 30$b$ is the source of the speech in the multichannel input signal 22. The final zone detector model 500 may include a sub-band directionality threshold, a frame directionality threshold, and a dominance threshold that are each set/selected during tuning for the particular model of the vehicle 10.

Figure 5:
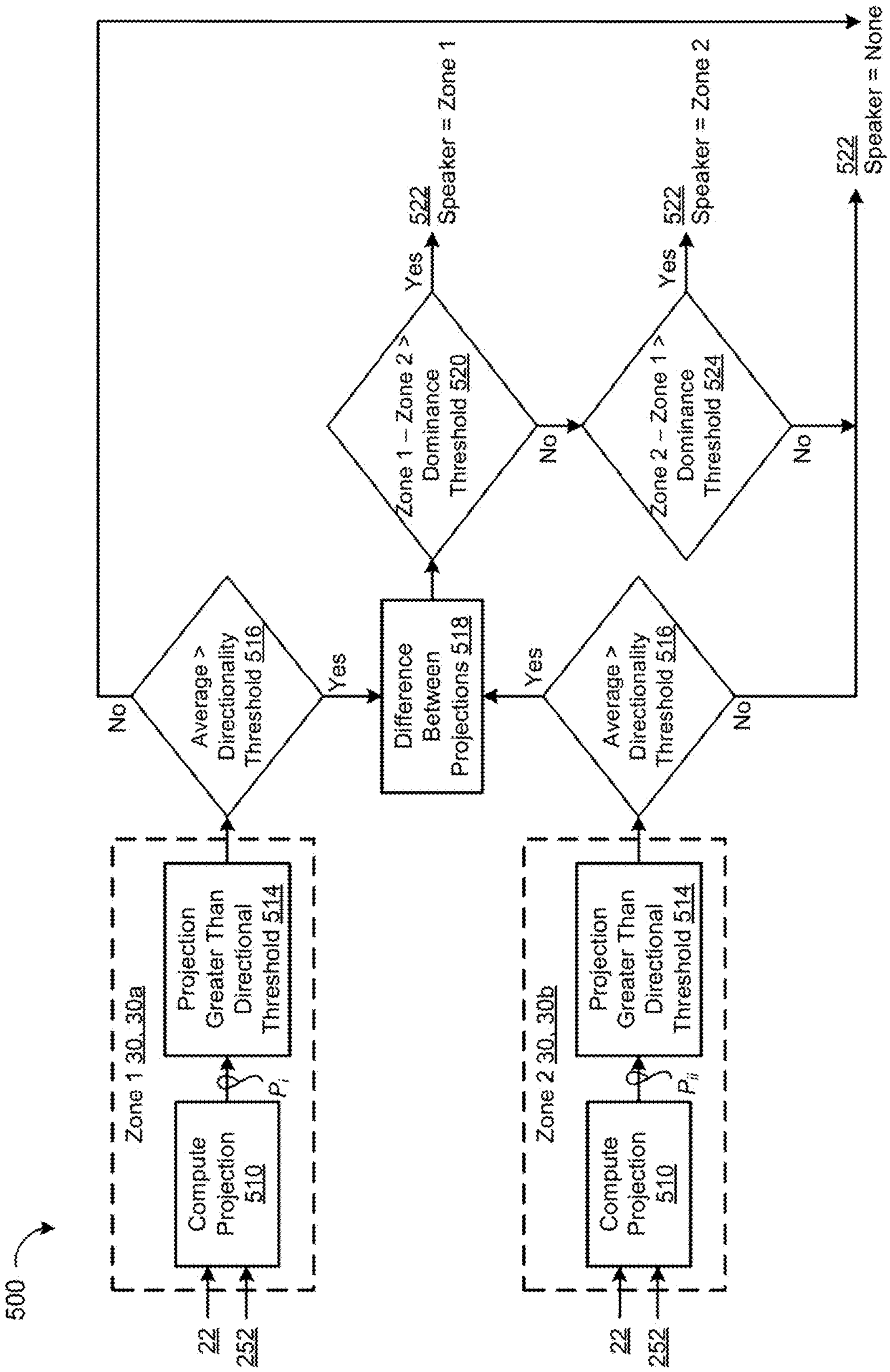
FIG. 5 is a flowchart of an example arrangement of operations for a method of generating a final zone prediction of a speaker.

Referring to FIG. 5, for each zone 30$a$, 30$b$, at operation 510, the final zone detector model 500 receives the multichannel input signal 22 and the respective steering vector 252, and projects the multichannel input signal 22 on the steering vector 252 to generate a respective projection P for each zone 30$a$, 30$b$. The projection P is expressed as:

$$P = \frac{\frac{h^H x x^H h}{h^H h}}{\mathrm{trace}(x x^H) - \frac{h^H x x^H h}{h^H h}}, \tag{6}$$

where h denotes the respective steering vector 252 and x denotes the multichannel input signal 22 in the frequency domain. As shown, the final zone detector model 500 computes a projection $P_i$ of the multichannel input signal 22 for the first zone 30$a$, and a projection $P_{ii}$ of the multichannel input signal 22 for the second zone 30$b$.

At operation 514, the final zone detector model 500 determines whether the respective projection P for each zone 30$a$, 30$b$ is greater than a sub-band directionality threshold. Here, when the respective projection P for each zone 30$a$, 30$b$ is greater than the sub-band directionality threshold, the final zone detector model 500 determines an average energy of the plurality of frequency sub-bands 212, and at operation 516, for each zone 30$a$, 30$b$, determines whether the average energy is greater than a frame directionality threshold. If the final zone detector model 500 determines that the average energy of a plurality of sub-bands 212 for a particular zone 30 is not greater than the frame directionality threshold, the final zone detector model 500 rejects the presence of speech in the multichannel input signal 22 for the particular zone 30 and generates a confirmation detection of speech indication 522 indicating that the particular zone 30 does not contain speech for the instant frame 24. Conversely, if the final zone detector model 500 determines that the average energy of a plurality of sub-bands 212 for a particular zone 30 is greater than the frame directionality threshold, it may confirm that speech is present in the frame 24, and proceed to the operation 518 to identify which zone 30 the speech originates from.

Here, the final zone detector model 500 may calculate a difference between the projections P of each zone 30$a$, 30$b$. For example, at operation 520, the final zone detector model 500 subtracts the projection $P_{ii}$ for the second zone 30$b$ from the projection $P_i$ of the first zone 30$a$ and, when the difference is greater than a dominance threshold, generates the confirmation detection of speech indication 522 identifying the first zone 30$a$ as the source of the speech in the multichannel input signal 22. Conversely, when the difference is less than the dominance threshold, the final zone detector model 500 proceeds to operation 524 where the final zone detector model 500 subtracts the projection $P_i$ for the first zone 30$a$ from the projection $P_{ii}$ of the second zone 30$b$ and, when the difference is greater than the dominance threshold, generates the confirmation detection of speech indication 522 identifying the second zone 30$b$ as the source of the speech in the multichannel input signal 22. Conversely, if at operation 524, the difference is less than the dominance threshold, the final zone detector model 500 generates the confirmation detection of speech indication 522 indicating that the zones 30$a$. 30$b$ do not contain speech for the instant frame 24.

Figure 6:
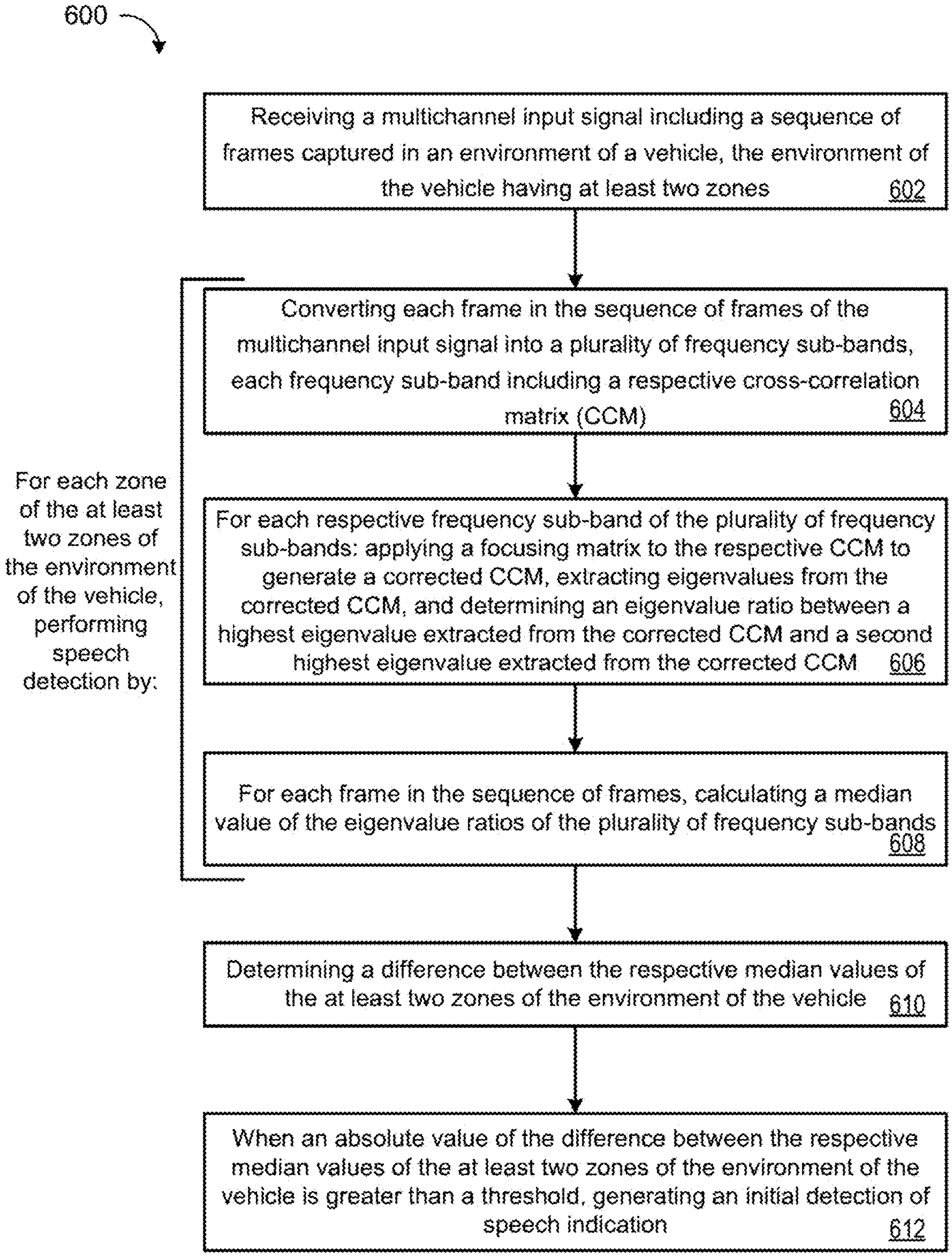
FIG. 6 is a flowchart of an example arrangement of operations for a method for onset zone detection.

FIG. 6 includes a flowchart of an example arrangement of operations for a method 600 of onset zone detection using coherent focusing summation over multiple geometric positions. The method 600 may be described with reference to FIGS. 1-5. Data processing hardware (e.g., data processing hardware 12, 62 of FIG. 1) may execute instructions stored on memory hardware (e.g., memory hardware 14, 64 of FIG. 1) to perform the example arrangement of operations for the method 600.

The method 600 includes, at operation 602, receiving a multichannel input signal 22 including a sequence of frames 24 captured in an environment 26 of a vehicle 10. Here, the environment 26 includes at least two zones 30. For each zone 30 of the at least two zones 30 of the environment 26 of the vehicle 10, the method 600 includes operations 604-606. At operation 604, the method 600 includes converting each frame 24 in the sequence of frames 24 of the multichannel input signal 22 into a plurality of frequency sub-bands 212. Each sub-band 212 includes a respective cross-correlation matrix (CCM) 214. For each respective frequency sub-band 212 of the plurality of frequency sub-bands 212, the method 600 includes, at operation 606, applying a focusing matrix T to the respective CCM 214 to generate a corrected CCM 222, extracting eigenvalues 402 from the corrected CCM 222, and determining an eigenvalue ratio 404 between a highest eigenvalue $\mathbf{402}_1$ extracted from the corrected CCM 222 and a second highest eigenvalue $\mathbf{402}_2$ extracted from the corrected CCM 222. At operation 608, the method 600 also includes, for each frame 24 in the sequence of frames, calculating a median value 406 of the eigenvalue ratios 404 of the plurality of frequency sub-bands 212.

At operation 610, the method 600 also includes determining a difference 408 between the respective median values 406 of the at least two zones 30 of the environment 26 of the vehicle 10. When an absolute value of the difference 408 between the respective median values 406 of the at least two zones 30 of the environment 26 of the vehicle 10 is greater than a threshold, the method 600 also includes, at operation 612, generating an initial detection of speech indication 412.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed on data processing hardware causes the data processing hardware to perform operations comprising:

receiving a multichannel input signal including a sequence of frames captured in an environment of a vehicle, the environment of the vehicle having at least two zones;

for each zone of the at least two zones of the environment of the vehicle, performing speech detection by:

converting each frame in the sequence of frames of the multichannel input signal into a plurality of frequency sub-bands, each frequency sub-band comprising a respective cross-correlation matrix (CCM);

for each respective frequency sub-band of the plurality of frequency sub-bands:

applying a focusing matrix to the respective CCM to generate a corrected CCM;

extracting eigenvalues from the corrected CCM; and determining an eigenvalue ratio between a highest eigenvalue extracted from the corrected CCM and a second highest eigenvalue extracted from the corrected CCM;

for each frame in the sequence of frames, calculating a median value of the eigenvalue ratios of the plurality of frequency sub-bands;

determining a difference between respective median values of the at least two zones of the environment of the vehicle; and when an absolute value of the difference between the respective median values of the at least two zones of the environment of the vehicle is greater than a threshold, generating an initial detection of speech indication.

2. The method of claim 1, wherein the operations further comprise converting the multichannel input signal into the sequence of frames.

3. The method of claim 1, wherein the focusing matrix is initialized from a steering vector unique to a model of the vehicle.

4. The method of claim 1, wherein the operations further comprise, for each zone of the at least two zones of the environment of the vehicle, confirming a presence of speech in each frame in the sequence of frames by:

projecting the multichannel input signal on a steering vector of the vehicle to generate a projection;

determining an average energy of the plurality of frequency sub-bands; and when the average energy exceeds a directionality threshold, confirming the presence of speech in the multichannel input signal.

5. The method of claim 4, wherein the operations further comprise:

determining a difference between respective projections of the at least two zones; and when the difference between the respective projections exceeds a dominance threshold, generating a confirmation detection of speech indication identifying a zone of the at least two zones as a source of the speech in the multichannel input signal.

6. The method of claim 5, wherein identifying the zone of the at least two zones as the source of the speech in the multichannel input signal is based on the initial detection of speech indication and the confirmation detection of speech indication.

7. The method of claim 4, wherein the steering vector is unique to the vehicle.

8. The method of claim 1, wherein the plurality of frequency sub-bands are in the frequency domain.

9. The method of claim 1, wherein the at least two zones comprise a first zone and a second zone.

10. The method of claim 1, wherein the speech detection is performed without historical audio data.

11. A system comprising:

data processing hardware; and memory hardware in communication with the data processing hardware, the memory hardware storing instructions that when executed on the data processing hardware cause the data processing hardware to perform operations comprising:

receiving a multichannel input signal including a sequence of frames captured in an environment of a vehicle, the environment of the vehicle having at least two zones;

for each zone of the at least two zones of the environment of the vehicle, performing speech detection by:

converting each frame in a sequence of frames of the multichannel input signal into a plurality of frequency sub-bands, each frequency sub-band comprising a respective cross-correlation matrix (CCM);

for each respective frequency sub-band of the plurality of frequency sub-bands:

applying a focusing matrix to the respective CCM to generate a corrected CCM;

extracting eigenvalues from the corrected CCM; and determining an eigenvalue ratio between a highest eigenvalue extracted from the corrected CCM and a second highest eigenvalue extracted from the corrected CCM;

for each frame in the sequence of frames, calculating a median value of the eigenvalue ratios of the plurality of frequency sub-bands;

determining a difference between respective median values of the at least two zones of the environment of the vehicle; and when an absolute value of the difference between the respective median values of the at least two zones of the environment of the vehicle is greater than a threshold, generating an initial detection of speech indication.

12. The system of claim 11, wherein the operations further comprise converting the multichannel input signal into the sequence of frames.

13. The system of claim 11, wherein the focusing matrix is initialized from a steering vector unique to a model of the vehicle.

14. The system of claim 11, wherein the operations further comprise, for each zone of the at least two zones of the environment of the vehicle, confirming a presence of speech in each frame in the sequence of frames by:

projecting the multichannel input signal on a steering vector of the vehicle to generate a projection;

determining an average energy of the plurality of frequency sub-bands; and when the average energy exceeds a directionality threshold, confirming the presence of speech in the multichannel input signal.

15. The system of claim 14, wherein the operations further comprise:

determining a difference between respective projections of the at least two zones; and when the difference between the respective projections exceeds a dominance threshold, generating a confirmation detection of speech indication identifying a zone of the at least two zones as a source of the speech in the multichannel input signal.

16. The system of claim 15, wherein identifying the zone of the at least two zones as the source of the speech in the multichannel input signal is based on the initial detection of speech indication and the confirmation detection of speech indication.

17. The system of claim 14, wherein the steering vector is unique to the vehicle.

18. The system of claim 11, wherein the plurality of frequency sub-bands are in the frequency domain.

19. The system of claim 11, wherein the at least two zones comprise a first zone and a second zone.

20. The system of claim 11, wherein the speech detection is performed without historical audio data.

* * * * *